July 17, 1934.  C. C. GRAY ET AL  1,966,443
GRAIN SCALPING AND ASPIRATING MACHINE
Filed May 24, 1930   8 Sheets-Sheet 1

INVENTORS
CARL C. GRAY
BY HARRY L. JOHNSON
ATTORNEY

July 17, 1934.  C. C. GRAY ET AL  1,966,443
GRAIN SCALPING AND ASPIRATING MACHINE
Filed May 24, 1930   8 Sheets-Sheet 6

INVENTORS
CARL C. GRAY
BY HARRY L. JOHNSON
ATTORNEY

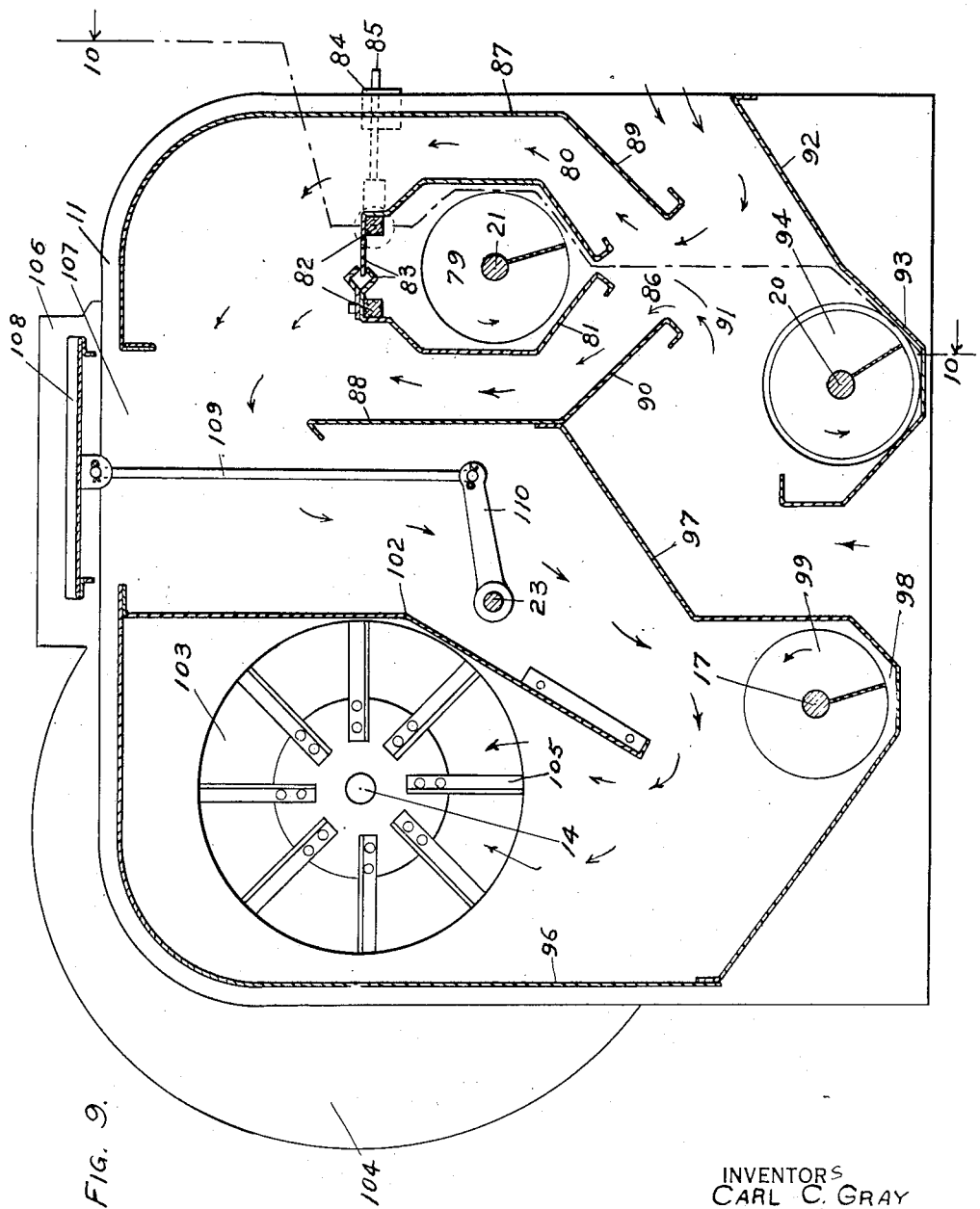

July 17, 1934.  C. C. GRAY ET AL  1,966,443
GRAIN SCALPING AND ASPIRATING MACHINE
Filed May 24, 1930  8 Sheets-Sheet 8

INVENTORS
CARL C. GRAY
BY  HARRY L. JOHNSON
ATTORNEY

Patented July 17, 1934

1,966,443

UNITED STATES PATENT OFFICE 1,966,443

GRAIN SCALPING AND ASPIRATING MACHINE

Carl C. Gray, Minneapolis, and Harry L. Johnson, St. Paul, Minn.

Application May 24, 1930, Serial No. 455,233

16 Claims. (Cl. 209—139)

This invention relates to grain cleaning and separating machinery, and the primary object is to provide an efficient, practical, and highly novel form of grain scalping and aspirating mechanism which will remove the dust and chaff, as well as the sticks, cobs, and other relatively large pieces of foreign matter before the grain is delivered to a series of separating units where the various species of intermingled grains are divided from each other. A further object is to provide a combination scalper and aspirator which, while comparatively simple and compact, is capable of handling a large volume of material within a limited space of time, thus giving it an efficient grain treating capacity greater than that of any other machine which within our knowledge could be built at approximately the same cost, or be operated at a like expense per bushel of grain handled by it. These and other objects will be more specifically disclosed in the course of the following specification, reference being had to the accompanying drawings, in which:

Fig. 9 is a sectional elevation as on the line 9—9 in Fig. 10.

Figure 1:
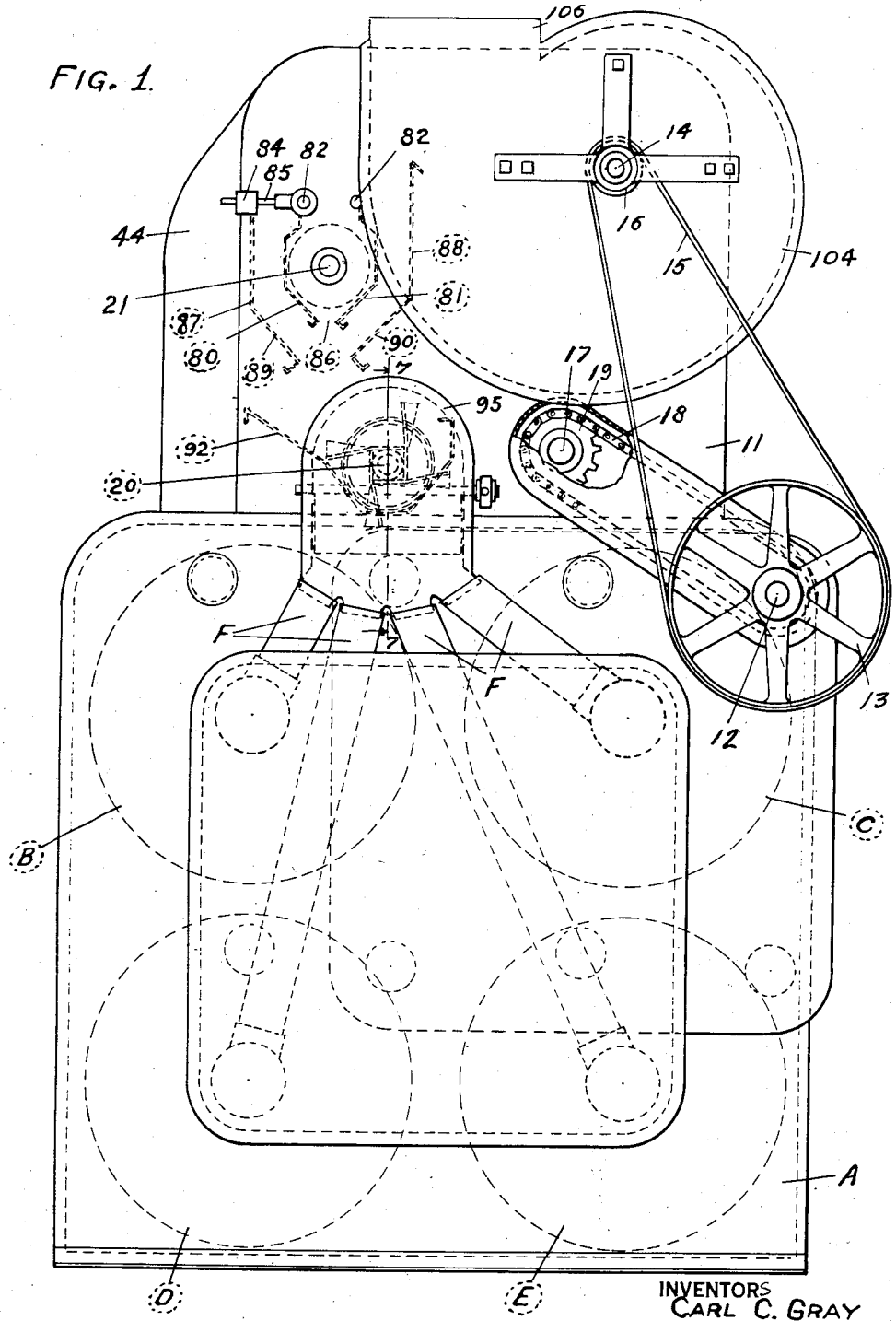
Fig. 1 is an end view of our combination scalper and aspirator, showing it as mounted upon a multi-unit separator, and connected therewith.

Referring to the drawings more particularly and by reference characters, A designates the main frame and housing of a separator machine having a plurality of separator units B, C, D, and E, indicated in dotted lines in Fig. 1. The separator machine may be of any standard or special design, and the units B—E are simultaneously driven in any suitable manner and are designed to separate the grains as they are delivered thereto by our scalping and aspirating machine through pipes or feed tubes F which conduct the mixed or intermingled grains to the respective separator units.

The scalping and aspirating machine comprises a main housing 11 and smaller associated housings, which enclose the grain treating machinery, and these housings are preferably mounted upon the separating machine and rigidly secured to it. Power is applied to the scalper and aspirator mechanisms from a continuously rotating shaft 12 of the separator. This shaft has a pulley 13 which drives the aspirating fan shaft 14 through a belt 15 and a smaller pulley 16 on the last mentioned shaft. The main shaft 17 of the machine is also driven directly from the shaft 12 by a sprocket chain 18 and sprocket gears 19. The scalping and aspirating apparatus, hereinafter referred to as the machine, is also provided with other shafts 20, 21, 22, 23, and 24, the purpose and driving connections of which will presently be described.

Figure 3:
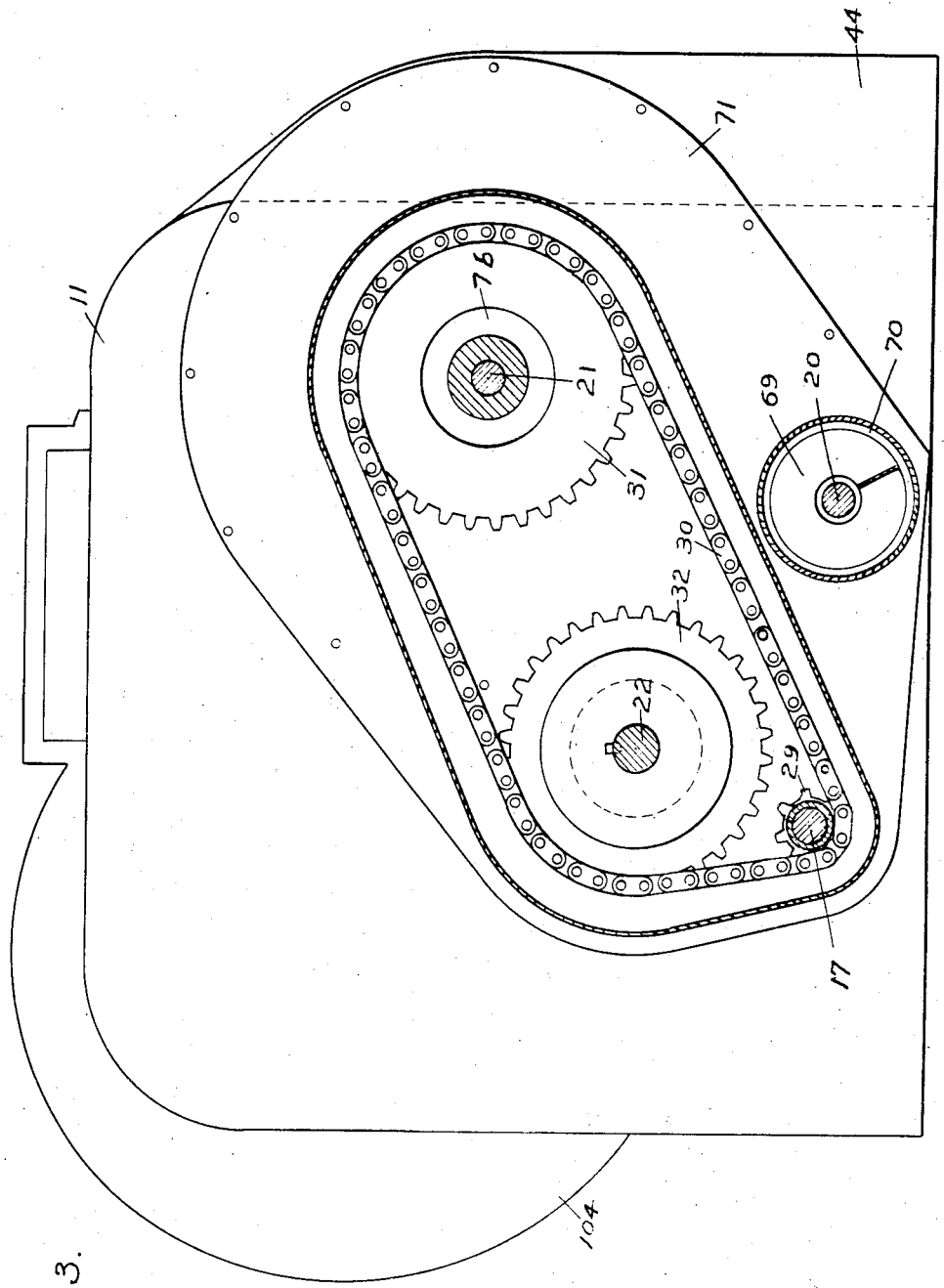
Fig. 3 is a sectional elevation on the line 3—3 in Fig. 6.

The shaft 17 drives shafts 20 and 21 through the medium of a sprocket chain 25 and sprocket pinions 26, 27, and 28, (see Figs. 5 and 6) and shaft 17 has a second sprocket pinion 29 which engages a sprocket chain 30 to drive sprocket gears 31 and 32 (Figs. 3 and 6), to the first of which rotates a pick up mechanism rotating concentric with shaft 21, while the latter is operative to drive the shaft 22 through a friction slip clutch 33 at one end of the shaft 22. This clutch is normally held closed or in operative position by a spring 34 the tension of which is adjustable by a pair of lock nuts 35. The end of the shaft 22 opposite from the clutch has a pinion 36 meshing with a sprocket chain 37 to drive a sprocket gear 38 which operates a sleeve 39 supporting a pair of spaced disks 40 having profusely distributed perforations 41. Thus the disks 40 rotate about but at a different speed than the shaft 21. The disks are braced by being bolted to and spaced from a pair of plates 42 which are also attached to and rotated with the sleeve 39.

Figure 5:
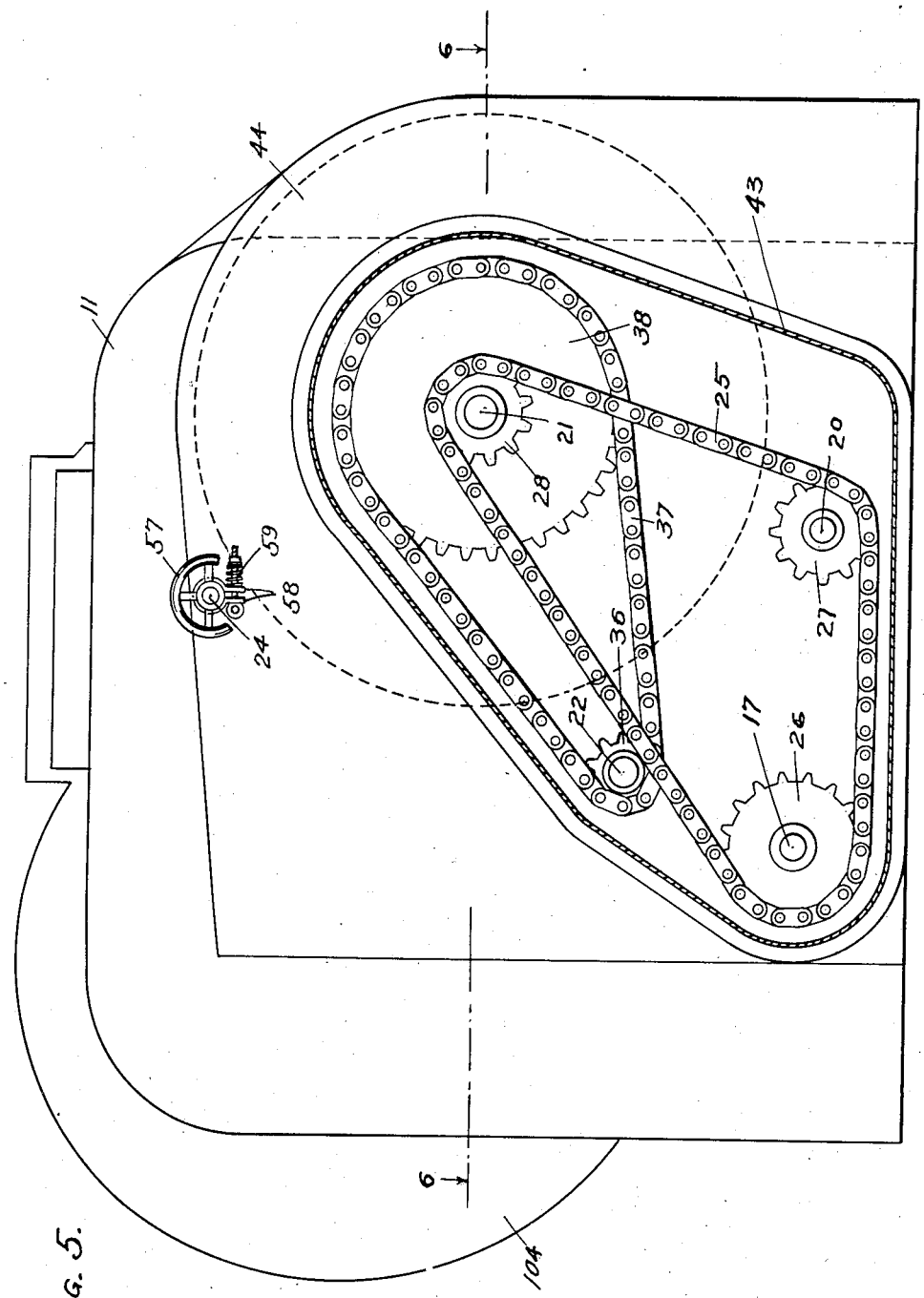
Fig. 5 is a sectional elevation on the line 5—5 in Fig. 6.
Figure 6:
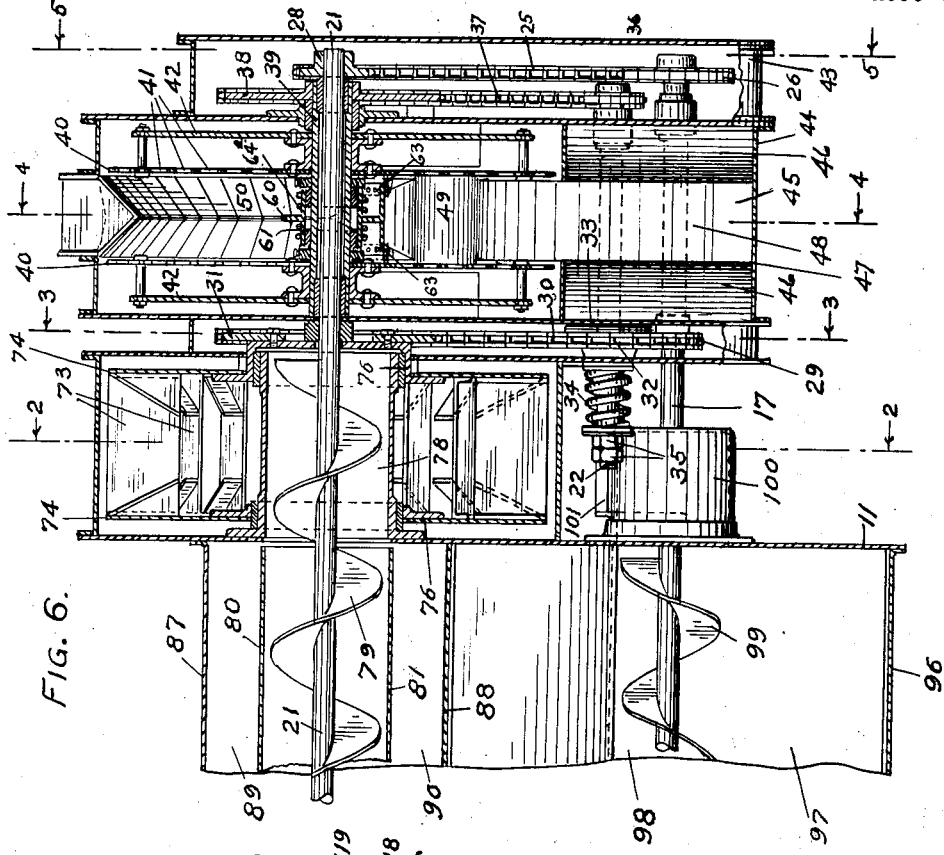
Fig. 6 is a horizontal sectional plan view on the line 6—6 in Fig. 5.
Figure 8:
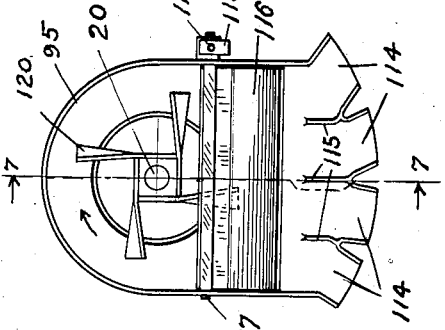
Fig. 8 is a detail elevation as on the line 8—8 in Fig. 7.
Figure 7:
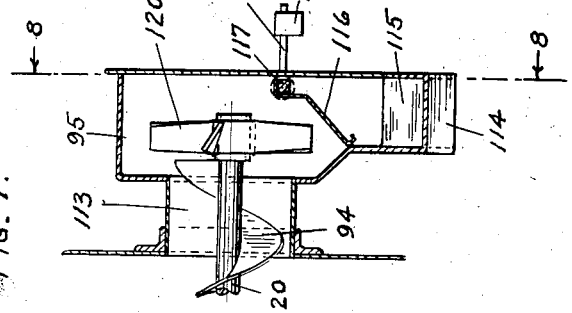
Fig. 7 is an enlarged detail sectional elevation, as on the line 7—7 in Fig. 1, or as on the line 7—7 in Fig. 8.

The sprocket chain and gear mechanism at the end of the machine, as shown in Fig. 5, is inclosed within a housing member 43 secured to a second housing section 44 inclosing the scalper unit.

Figure 4:
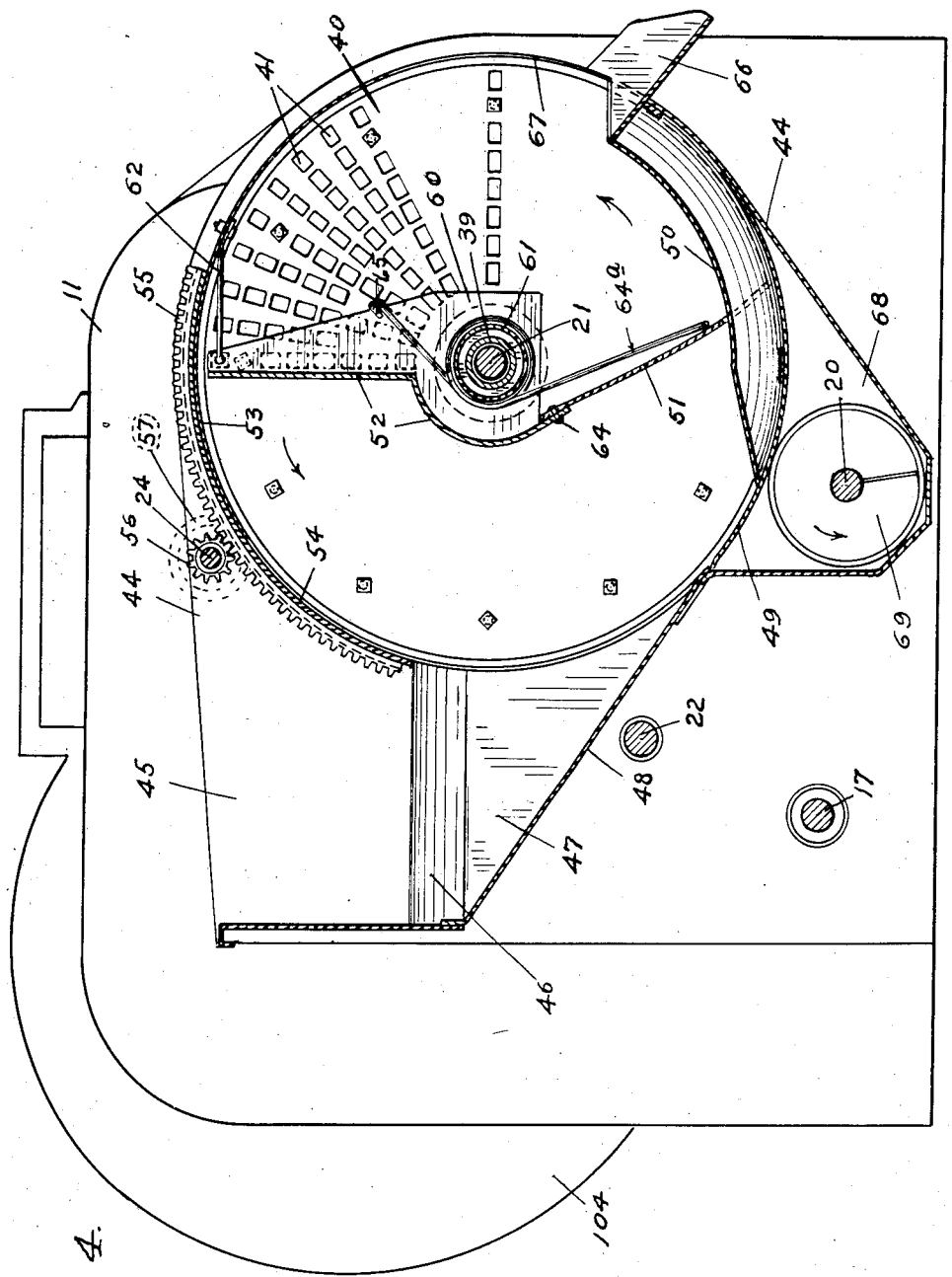
Fig. 4 is a sectional elevation on the line 4—4 in Fig. 6.
Figure 10:
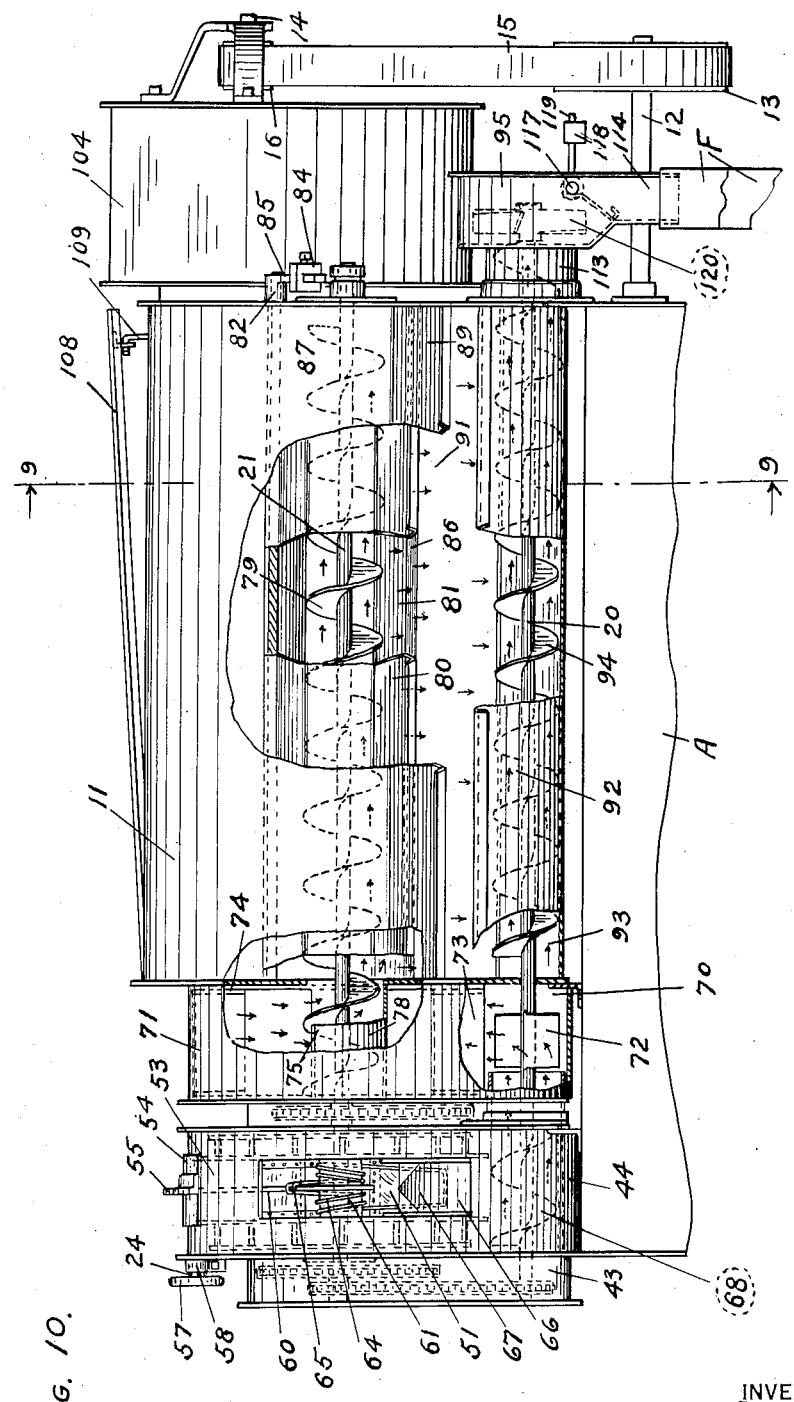
Fig. 10 is a front elevation of the machine, with fractional portions broken away as on the line 10—10 in Fig. 9 for purpose of illustration.

The housing section 44 forms an open hopper 45 (Figs. 4 and 6), into which the material to be cleaned and separated is placed. The lower walls of the hopper incline inwardly, as at 46, and downwardly as at 47, to meet the inclined bottom 48, thus conducting the material into a chamber formed by the disks 40, a bottom plate 49, a spreader, 50, a retarder 51 carried by a transverse partition member 52, an arcuate upper plate 53, and an arcuate gate 54. The gate 54 is slidable on the plate 53 so that its lower end will be vertically adjustable, and has a toothed rack 55 meshing with a pinion 56 on one end of the shaft 24. This shaft has a small hand wheel 57 (Figs. 4, 5 and 10), by which adjustments to the gate are affected, and the shaft is yieldingly retained in adjusted positions by a pair of friction blocks 58 that engage the shaft under the tension of a spring 59.

The plate 52 has a centrally disposed flange 60 having a collar 61 rotatably mounted on the sleeve 39. At its upper end the member 52—60 has a link 62 connecting it to the plate 53 so as to prevent rotation of the member 52—60 with the sleeve. In order to establish close contact between the disks 40 and the plate 52 the sides of the latter are preferably provided with a pair of flexible contact strips 63 (Fig. 6) which engage the inner faces of the perforated disks.

The retarder plate 51 attaches to the lower end of the stationary plate 52, as at 64, and its lower end has a V-shaped notch so as to more closely fit over the divider 50. The plate 51 is best formed of semi-flexible material and yieldingly presses against the incoming flow of material under the action of a spring 64ª which is coiled about the hub 61, with one end in engagement against the plate 51 while the other end is anchored, as at 65, to the flange or rib 60.

The delivery end of the spreader 50 terminates in a short chute 66 under a housing opening 67 through which the scalpings are discharged.

The operation of the scalping mechanism, as thus far set forth, may be briefly described as follows:

As the material to be scalped, aspirated, and separated is directed into the hopper 45 it flows down over the inclined floor plate 48 between the walls 47, and under the gate 54 into the chamber formed by the members 49, 50, 51, 52 and the disks 40. The height of the grain body banked up against the plates 51 and 52 is determined by the position of the gate 54. As the disks 40 are continuously rotated, in the direction of the arrow in Fig. 4, the small particles such as the grain, dirt, dust, chaff, etc., fall through the profusely distributed perforations, while the larger elements, such as cobs, sticks, stones, etc., gradually settle to the bottom and find their way out after passing under the retarder 51 to the opening 67 and chute 66. The ridged or tapered spreader 50 prevents the discharge of any grain, through the opening 67, that may have escaped under the retarder 51, because it keeps such grain in contact with the two disks during the upward travel from 51 to 66, at which time such grain will rapidly fall out through the perforations.

As the grain (and other small particles) passes outwardly through the two disks 40 it falls down into a chamber 68 in which operates a feed screw 69, secured to the shaft 20, and which feed screw moves the grain, longitudinally of the machine, into a similar chamber or pocket 70 that opens upwardly only in a cylindrical chamber or housing 71, disposed between the main housing 11 and the smaller housing 44.

Within the chamber 70 the shaft 20 carries a pair of paddles 72 (Figs. 2 and 10) the purpose of which is to agitate and virtually boil up the incoming grain, so that as its surface level raises it will bring the grain into contact with a series of spaced paddles 73 mounted between a pair of circular plates 74 and forming a rotary elevator for raising the grain from the chamber 70. As the grain is carried up by the paddles 73 (Fig. 2) it drops into a stationary flanged hopper 75, and in order to overcome any possible tendency of the paddles to carry the grain beyond the hopper, by centrifugal action, the paddles are preferably set at an angle to a radial line passing through each of them. The carrier has hub forming members 76, trunnioned on a fixed semisleeve portion 78 of the hopper 75, and the member 76 nearest the scalper, may also have bearing engagement with the shaft 21 (see Fig. 6) carries and is driven by the sprocket gear 31.

As the elevated grain falls into the hopper 75, 78, it is removed therefrom by a relatively long feed screw 79 on the shaft 21. This feed screw operates in an elongated open bottom trough formed by a pair of relatively movable side walls or plates 80 and 81 the cross sectional contours of which are illustrated in Fig. 9. These plates are pivoted at their ends, as at 82, to the end walls of the main housing 11, so that they are free to swing on longitudinal pivot centers; and in order to insure simultaneous and similar swinging action to both plates I provide the coordinating device shown at 83 in Fig. 9, and which device also serves to close the top of the trough chamber.

As the grain is conveyed longitudinally through the trough 80—81 by the feed screw 79 its weight upon the lower inclined portions thereof tends to spread the plates, but this tendency is offset in part by a weight 84 adjustably secured to an arm 85 of the plate 80. Thus the size of the opening 86 between the lower ends or edges of the trough plates 80—81 varies in proportion to the volume of grain accumulated about the feed screw 79 in the trough.

As the grain drops in a narrow stream from the long slot like opening 86 it is subjected to the aspirating process resulting from or effected by the following arrangement of mechanical elements.

An outer wall 87 of the housing 11 is spaced from the trough plate 80, and a similar, inner wall 28 is similarly disposed with respect to the trough plate 81. The lower ends of these walls slope inwardly as at 89 and 90, respectively to form an elongated opening 91 which is larger than but disposed directly below the opening 86. A catch plate 92 is disposed below the opening 91 and directs grain falling upon it into a trough 93. A feed screw or auger 94, carried by the shaft 20, operates in this trough, and conveys the grain into a chamber 95, at one end of the machine.

Extending from an intermediate part of the wall 88 to the lower edge of an outer wall 96, of the housing 11, is an irregular floor or bottom plate 97, a portion of which forms a settling chamber trough 98. The shaft 17 operates in this trough, and has a feed screw 99 for conveying the settled material to an end chamber 100 having a door 101 (Figs. 2 and 6) through which such material is discharged from the machine.

Extending downwardly into the settling chamber, formed by the plate members 88, 97, and 96, is an angular partition 102, and between this partition and the outer wall 96 the end wall of the housing 11 has a circular opening 103 communicating axially with the fan housing 104. The fan or blower 105 is mounted on the shaft 14 and when rotated causes a draft or current of air to pass through the machine and out through the exhaust or discharge opening 106 of the blower. The fan outlet is of course preferably connected to a tubular conveyor so that the dust and chaff may be deposited at a suitable point remote from the machine.

It will be noted that the air current drawn through the machine is restricted to a predetermined circuitous course by the various walls, plates and partitions, as shown particularly in Fig. 9, wherein it will be seen that air is drawn in from the outside of the machine over both edges of the plate 92, and thence upwardly through the opening 91, after which it divides into two currents, one passing up between the members 81 and 88, while the other passes up between members 80 and 87. The two air streams then again join, passing over the partition 88 and then under the partition 102 to the blower fan 105.

Figure 2:
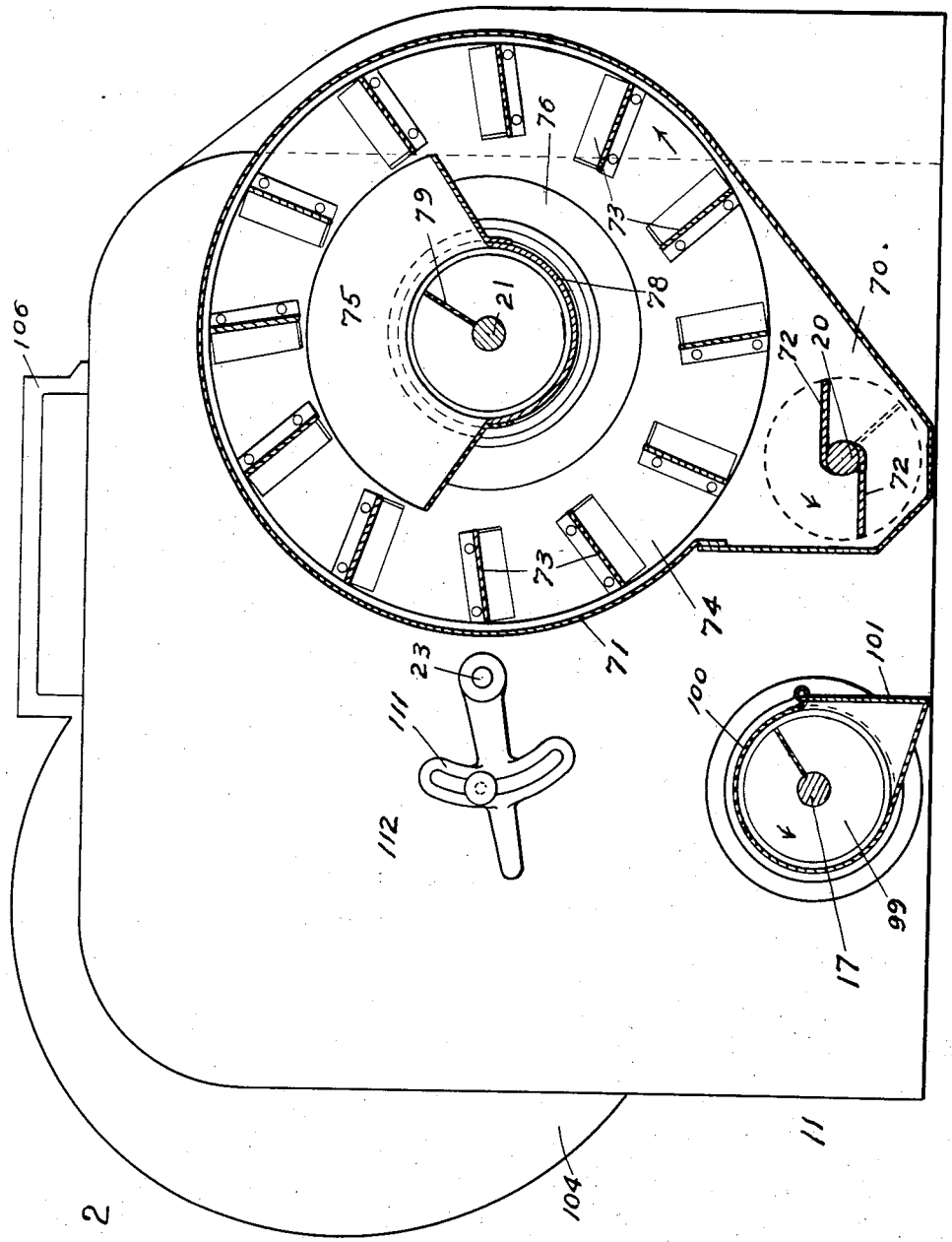
Fig. 2 is a sectional elevation on the line 2—2 in Fig. 6.

The force of the air current may be regulated to meet varying grain conditions in various ways, such as by modifying the speed of the fan, but we prefer to not disturb the fan speed, and to modify the air current through 91 by providing an auxiliary air inlet opening 107 in the top of the main housing 11. The size of this opening is controlled by a door 108 (Figs. 9 and 10), one end of which is vertically adjustable by a link 109 that connects it to the crank 110 of the shaft 23. This shaft, as shown in Fig. 2, has a slotted segment 111, at one end of the housing 11, that is adjustably secured by a thumb screw 112. Thus by manipulating the members 111—112, the door 108 may be adjusted as desired, so as to regulate the air current through the opening 91, it being understood that as the door 108 is opened the inrushing air will partially relieve or reduce the current drawn upwardly about the aspirator trough 80—81.

The aspirating process may be briefly described as follows: As the long, horizontally curtain like stream of grain is discharged from the opening 86 it immediately comes into contact with the strong upward flow of air through opening 91. This air current, coming in from both sides, under the plates 89 and 90, does not merely shunt the grain stream to one side as would frequently be the case if only one air stream were employed, but thoroughly diffuses and agitates the grain so that the air has an opportunity to reach and remove every particle of dust and chaff from the grain. It will also be noted (in Fig. 9) that the gap between the lower edges of the plates 89 and 90 is less than the combined widths of the spaces between the plates 81 and 88, and 80 and 87, and consequently the air stream as it passes up through opening 91 is more violent than when it reaches the less restricted spaces above. As a result of this arrangement it is found, in practice, that the grain is subject to a violent whirlpool action immediately above the opening 91 and only drops down to the catch plate 92 after having been thoroughly air cleaned in the whirlpool action noted.

As the grain drops down the lighter particles such as dust and chaff are carried over the partition 88 and follow with the air current under the partition 102 to the fan 105. The heavier particles carried over 88 may include some smaller grains and seed, which are saved by being shunted off into the settling chamber trough 98, as they will not so readily adhere to the upwardly turned air current. As previously noted the material deposited in the trough 98 is augered out by the screw 99, to be discharged through the door 101.

The cleaned grain is disposed up by the mechanism illustrated in Figs. 1, 7, 8, and 10, in the following manner. As fast as the grain accumulates in the trough 93 it contacts with the continuously revolving screw 94 which conveys it out through a short tube 113 to the chamber or housing 95. This housing has four outlets 114, connecting with the tubes F leading to the separator units B—E. In order that the grain may be equally distributed to the outlets, regardless of the volume being discharged from the machine, we separate the outlet openings by spacing plates 115, and above these plates we provide a trap door 116 which pivots at 117 and closes against one wall of the housing 95 to form a yieldable bottom therefor. The door 116 is yieldably held closed by a weight 118 adjustably secured upon an arm extension 119 of the door. The end of the shaft 20, above the door 116, is provided with a paddle wheel 120, which as the grain accumulates in the chamber 95 mixes it up and distributes it over the length of the door. This wheel also acts to press the grain downwardly to open the door, and at such time the grain is free to flow down to be properly distributed and conveyed to the respective separating units as previously mentioned.

It may be here explained that the purpose of the slip clutch 33 is to relieve the various driving connections of undue strain when, for instance, the rotating disks 40 become subject to strain or resistance such as might occur if a stick or other large article wedges or clogs the mechanism. In such event the obstruction should be removed by the attendant as soon as noticed.

It is understood that suitable modifications may be made in the general design and structural details of the machine as hereinabove set forth, provided, however, that such modifications come within the spirit and scope of the appended claims. Having now therefore fully disclosed and described the invention, what we claim to be new and desire to protect by Letters Patent is:

1. A grain treating apparatus comprising a scalping mechanism and an aspirator cooperatively associated in a unitary machine, said aspirator having a feed screw with a shaft extending into the scalping mechanism, and said scalping mechanism having a scalper unit rotatable about the shaft, a stationary chamber in the machine for receiving scalped grain from the said scalper unit, means operating in the chamber to agitate the grain so as to raise the surface thereof at a certain point, and a pick up mechanism, associated with the shaft and agitating means, operative to remove the grain from the chamber at said point and deliver it to the aspirator feed screw.

2. A grain treating apparatus comprising a scalping mechanism and an aspirator disposed adjacent each other in a single machine structure, and having rotary members for acting on grain, a stationary chamber in the machine for receiving scalped grain from the rotary scalping member, means operating in the chamber to agitate the grain so as to raise the surface thereof at a certain point, and a pick up mechanism disposed intermediate the scalping mechanism and aspirator operative to remove the grain from the chamber at said point and deliver it to the aspirator, said pick up mechanism including a rotor movable through the stationary chamber having circumferentially spaced members for successively removing portions of grain from the body of grain in the chamber and delivering such grain portions to the rotary member of the aspirator.

3. A grain treating machine comprising a scalping mechanism having a rotatable member for acting on grain, an aspirating mechanism having a grain trough provided with a feed screw therein, said feed screw having a shaft disposed in axial alignment with and for supporting the rotatable member of the scalping mechanism, and means in part rotatable about the said shaft for conveying material from the scalping mechanism to the grain trough of the aspirating mechanism.

4. A grain treating machine comprising a scalping mechanism having a rotatable member for acting on grain, an aspirating mechanism having a grain trough provided with a feed screw therein in axial alignment with the rotatable member of the scalping mechanism, said feed screw having an axial shaft extending into the scalping mechanism and through the rotatable member thereof, means for conveying grain discharged from the scalping mechanism to the aspirating mechanism, and means for driving the shaft to actuate the said feed screw.

5. A grain treating machine comprising a scalping mechanism and an aspirating mechanism disposed horizontally with respect to each other, a rotatable shaft extending from one mechanism to the other, said scalping mechanism having a rotary treating member arranged to axially receive and be supported by the shaft, means for conveying grain from the scalping mechanism to the aspirating mechanism, and said aspirating mechanism having a feed screw driven by the shaft.

6. A grain treating machine comprising a scalping mechanism and an aspirating mechanism disposed horizontally with respect to each other, a rotatable shaft extending from one mechanism to the other, said scalping mechanism having a rotary treating member axially receiving the shaft, said aspirating mechanism having a feed screw carried on the shaft for rotation therewith, and means for conveying grain from one of said mechanisms to the other.

7. A grain treating machine comprising a scalping mechanism and an aspirating mechanism disposed horizontally with respect to each other, a rotatable shaft extending from one mechanism to the other, said scalping mechanism having a rotary treating member supported by one end of the shaft, said aspirating mechanism having a grain feeding device driven by the other end of the shaft, and means for conveying grain from one mechanism to the other including a pick up device rotatable upon the shaft and between the said mechanisms.

8. A grain treating machine comprising a scalping mechanism and an aspirating mechanism disposed horizontally with respect to each other, a rotatable shaft extending from one mechanism to the other, said scalping mechanism having a rotary treating member axially receiving the shaft, said aspirating mechanism having a feed screw driven by the shaft, and means for conveying material from the scalping mechanism to the aspirating mechanism.

9. A grain treating machine comprising a scalping mechanism and an aspirating mechanism disposed horizontally with respect to each other, a rotatable shaft extending from one mechanism to the other, said scalping mechanism having a rotary treating member supported for independent rotation on the shaft, and said aspirating mechanism having a feed screw rigid with and driven by the shaft, and means for driving said rotary treating member and said feed screw shaft at different speeds with respect to each other.

10. A grain treating machine comprising a housing having a scalping mechanism in one end portion and an aspirating mechanism in an adjacent portion, a chamber in the housing for receiving grain from the scalping mechanism, agitating means operating in the chamber to raise the level of the grain therein at a certain point, a rotary conveyor operative over the chamber and having pick up devices adapted to remove grain therefrom, a receiving trough for the aspirating mechanism extending into the rotor to receive the picked up grain from the pick up devices as the latter approach a topmost position, and a power shaft with connections for simultaneously actuating the scalping mechanism, agitating means and rotary conveyor.

11. A grain treating machine comprising a housing enclosing a scalping mechanism and an aspirating mechanism, a chamber for receiving grain from the scalping mechanism and extending laterally therefrom, a screw acting device for moving the grain in the chamber toward said extended end thereof, agitating means in said extended end of the chamber to raise the level of the grain therein, a pick up device for picking up grain from the extended end of the chamber to deliver it to the aspirating mechanism, and power means for simultaneously actuating said mechanisms, said devices and said agitating means.

12. A grain treating machine comprising a housing enclosing a scalping mechanism and an aspirating mechanism in a unitary machine structure, and a grain elevating rotor disposed between the two mechanisms; a chamber extending from the lower part of the scalping mechanism to in under the rotor, means for moving grain in the chamber, a conveyor extending from the aspirating mechanism for receiving grain from the rotor, and power means for simultaneously actuating said mechanisms, rotor, and conveyor.

13. A grain treating machine comprising a housing enclosing a scalping mechanism and an aspirating mechanism in a unitary machine structure and a grain elevating rotor disposed between the two mechanisms; a chamber extending from the lower part of the scalping mechanism to in under the rotor, means for moving grain in the chamber, a hopper for receiving grain from the rotor, a screw extending into the hopper to convey material therein to the aspirating mechanism, and power means with connections for simultaneously actuating the said mechanisms, the rotor, and the conveyor screw.

14. A grain treating machine comprising a housing enclosing a scalping mechanism and an aspirating mechanism in a unitary machine structure and a grain elevating rotor disposed between the two mechanisms; a chamber extending from the lower part of the scalping mechanism to in under the rotor, an agitating device in the chamber, a trough for receiving aspirated grain, a feed screw in the trough, a shaft extending from the said feed screw into the chamber to actuate said agitating device, and power transmitting means for simultaneously actuating the said mechanisms and said rotor and feed screw shaft.

15. A grain treating machine comprising a scalping mechanism having a chamber for receiving scalped grain, a screw in the chamber for conveying the grain therefrom, an aspirating mechanism, means for conveying grain from the chamber to the aspirating mechanism, a trough for receiving aspirated grain, a screw in the trough for conveying grain therefrom, said screws being in alignment and having a common shaft supporting and actuating the same.

16. A scalping and aspirating machine comprising connected and intercommunicating casings forming a unitary housing enclosure, a pair of rotatable scalping disks in one end portion of the enclosure, an aspirator in another portion of the enclosure and having a trough for receiving grain, devices for conveying grain from the scalping disks to the trough, a shaft extending through the trough and having a screw thereon for conveying the grain longitudinally of the trough, bearings for rotatably supporting the scalping disks, a power shaft, and connections with the power shaft for simultaneously driving the disks, screw shaft, and conveying devices.

CARL C. GRAY.
HARRY L. JOHNSON.